(12) United States Patent
Kojima et al.

(10) Patent No.: US 6,276,650 B1
(45) Date of Patent: Aug. 21, 2001

(54) SEAT STRUCTURE FOR VEHICLES

(75) Inventors: Yasuhiro Kojima, Kariya; Yukifumi Yamada, Toyota, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/401,796

(22) Filed: Sep. 22, 1999

(30) Foreign Application Priority Data

Sep. 25, 1998 (JP) .................................................. 10-271340

(51) Int. Cl.[7] ............................ F16M 13/00; B60N 2/12
(52) U.S. Cl. ............................................. 248/429; 248/421
(58) Field of Search ................................... 248/424, 421, 248/419, 422, 429, 393, 395, 396; 297/344.1, 344.13, 344.15

(56) References Cited

U.S. PATENT DOCUMENTS

| | | | |
|---|---|---|---|
| 4,720,070 | * | 1/1988 | Nishino ................................. 248/394 |
| 4,767,157 | * | 8/1988 | Kazaoka et al. ....................... 297/322 |
| 4,778,138 | * | 10/1988 | Yamada ................................. 248/421 |
| 4,948,081 | * | 8/1990 | Hatta ..................................... 248/396 |
| 5,154,402 | * | 10/1992 | Hill et al. .............................. 248/429 |
| 5,622,406 | * | 4/1997 | Meschkat et al. .................... 297/318 |
| 5,664,755 | * | 9/1997 | Gruber .................................. 248/424 |
| 5,697,674 | * | 12/1997 | Aufrere et al. .................. 297/344.15 |

FOREIGN PATENT DOCUMENTS 60-199742    10/1985    (JP) .

\* cited by examiner

Primary Examiner—Ramon O. Ramirez
Assistant Examiner—Jon Szumny
(74) Attorney, Agent, or Firm—Burns, Doane, Swecker & Mathis, LLP

(57) ABSTRACT

To promote strength of lower arms for coupling rail members and a seat frame, each of the lower arms (4) is installed with a bead portion (21), a first recess portion (24) and a flat face portion (23) and the first recess portion (24) is made to be freely brought into contact with a projected portion (25) of an upper rail (3).

5 Claims, 5 Drawing Sheets

SEAT STRUCTURE FOR VEHICLES

BACKGROUND OF THE INVENTION

The present invention relates to a seat structure for a vehicle which has improved lower arms.

As disclosed in Japanese Patent Laid-Open Publication No. 199742/1985, a seat for a vehicle is provided with lower rails fixed to a floor panel of the vehicle, upper rails arranged slidably with respect to the lower rails and lower arms held by the upper rails for supporting the seat and the upper rails and the lower arms are coupled by links of a lifter for moving up and down the seat.

When such the seat is subjected to front collision or rear collision, there is a concern that the links of the lifter, particularly the rear side links are considerably deformed. Further, when the load in collision is very large, the load is absorbed by deforming the lower arms and at this occasion, deforming portions of the lower arms are not specified and a sufficient energy-absorbing characteristic may not be achieved.

SUMMARY OF THE INVENTION

It is an object of the invention to resolve the above-described problem of the conventional seat structure by improving a structure of lower arms.

According to the present invention, in order to resolve the above-described problem, there is provided means for enabling to bring lower arms into contact with floor side members.

Specifically, there is provided a seat structure for a vehicle having floor side members slidable to lower rails fixed to a floor of a vehicle and lower arms held by the floor side members for supporting the seat, wherein each of the lower arms is constituted by a plate having a flange produced by extending a side edge thereof in a side direction and a lower side of the flange of the plate is provided with a contact portion which is brought into contact with a portion of the floor side members when excessive load is operated on the seat.

According to the above specific means, when the vehicle is subjected to a front collision or a rear collision, the contact portion of the flange of the lower arm is brought into contact with the portion of the floor side members by high load applied on the seat. Thereby, deformation of links for coupling the lower arm and the floor side member is minimized.

Further, more preferably, there is provided a seat structure in which a bead portion extended in a longitudinal direction is formed at an erected wall portion of the lower arm and further, a flat face portion is formed on a front side thereof and a deformation base end portion which is disposed at a boundary between the bead portion and the flat face portion is formed at the lower side of the flange of the lower arm.

Thereby, according to this more preferable means, when the vehicle is subjected to front collision or rear collision, in the case where high load applied on the seat is very large, the lower arm is deformed along the boundary between the bead portion and the flat face portion with the deformation base end portion as a reference whereby necessary and sufficient energy absorption can firmly be carried out.

DETAILED DESCRIPTION OF PREFERRED EMBODIMENTS

Figure 1:
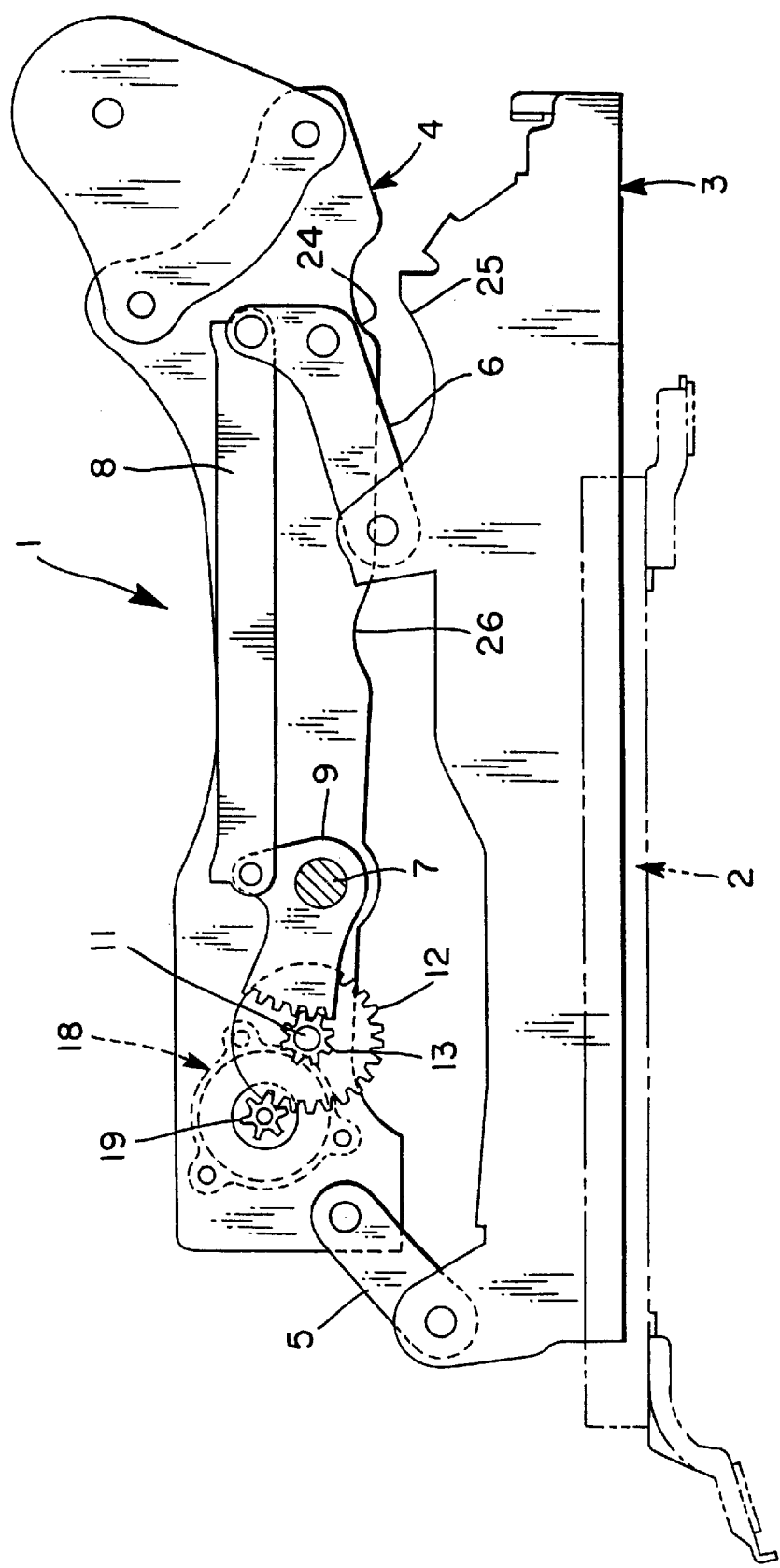
FIG. 1 is a side view of a vehicular seat according to an example of the invention.

A vehicular seat 1 includes floor side members of a vehicle comprising a pair of lower rails 2 and a pair of upper rails 3 slidable in the forward and rearward direction with respect to the lower rails 2, frames 4 for supporting a seat and front links 5 and rear links 6 connecting the frames 4 as seat supporting frames and the upper rails 3. Further, the left and the right side lower arms 4 are coupled by rods 7, respectively.

The rear link 6 which is pivotally connected to the lower arm 4 and the upper rail 3 is formed in an L-like shape and one end thereof is coupled to a ratchet 9 via a connection member 8. The ratchet 9 is pivotably supported by the lower arm 4.

Figure 2:
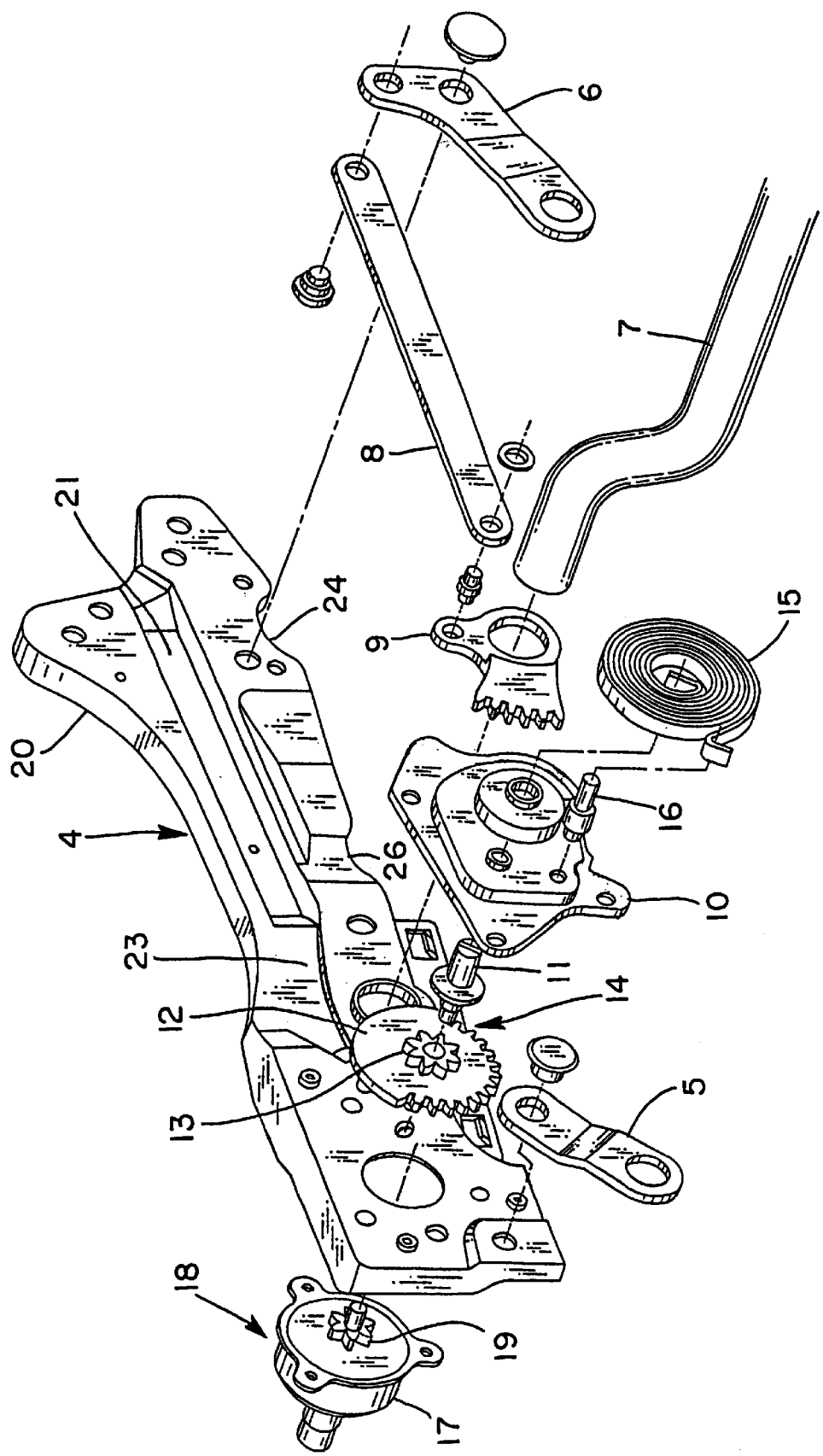
FIG. 2 is a partially disassembled perspective view of the example of FIG. 1.

As shown in FIG. 2, a bracket 10 is fixed to an inner side of the lower arm 4 and a shaft 11 is extended to the inner side of the lower arm 4 to be axially supported by the lower arm 4 and the bracket 10. A speed reducing middle or intermediate gear 14 comprising a gear 12 and a pinion 13 is integrally coupled to the shaft 11. That is, the two gears 12 and 13 and the shaft 11 are synchronously rotated.

A spring 15 is wound at a front end of the shaft 11 and one end thereof is engaged with the shaft 11 and other end thereof is engaged with a pin 16 fixed to the bracket 10. The spring 15 serves in assisting rotation of the shaft 11 in a direction of lifting the seat.

A drive member 18 of a type of a spring coupler 17 is fixed to an outer side of the lower arm 4. A pinion 19 of an output shaft of the drive member 18 is in mesh with the gear 12 of the middle gear 14 to thereby constitute a first speed-reducing portion. The spring coupler 17 operates to brake movement of the seat and maintain a predetermined attitude thereof.

When the drive member 18 is pivoted in one direction and the output shaft is pivoted while releasing braking operation of the spring coupler 17, the movement of the output shaft is transmitted from the pinion 19 to the gear 12 while the speed is being reduced to thereby pivot the shaft 11. At this occasion, the shaft 11 is pivoted while receiving urging force of the spring 15 and accordingly, the pinion 13 integral with the shaft 11 pivots the ratchet 9 by large force while the speed is being reduced. Pivotal movement of the ratchet 9 is transmitted to the rear link 6 via the connection member 8 and the rear link 6 lifts up the seat. When the seat is lifted to a predetermined height, operation of the drive member 18 is stopped and movement of respective parts for lifting the seat is braked by the spring coupler 17.

Further, when the seat is intended to be lowered, in a state in which the braking operation of the spring coupler 17 is released, the physical weight of a passenger may be applied on the seat and the seat may be pushed down against the above-described movement due to the spring 15 for lifting up the seat.

The lower arm 4 is provided with a flange 20 extended in an outer side direction at its side edge and a bead portion 21 formed to extend to the outer side direction and extended in the longitudinal direction. The bead portion 21 is formed by pressing at a rear half of a vertical wall portion of the lower arm 4 and a flat face portion 23 is constituted at a front half of the vertical wall portion of the lower arm 4. Incidentally, a plurality of the bead portions 21 may be formed substantially in parallel with each other.

A first recess portion 24 in a circular shape is provided at a lower portion of the flange 20 on the rear side of the lower arm 4. Further, a second recess portion 26 is provided at the lower portion of the flange 20 of the lower arm 4. The second recess portion 26 is thus disposed at a boundary between the bead portion 21 and the flat face portion 23 (that is, at a vicinity of a lower portion of a front end of the bead portion 21).

Figure 3:
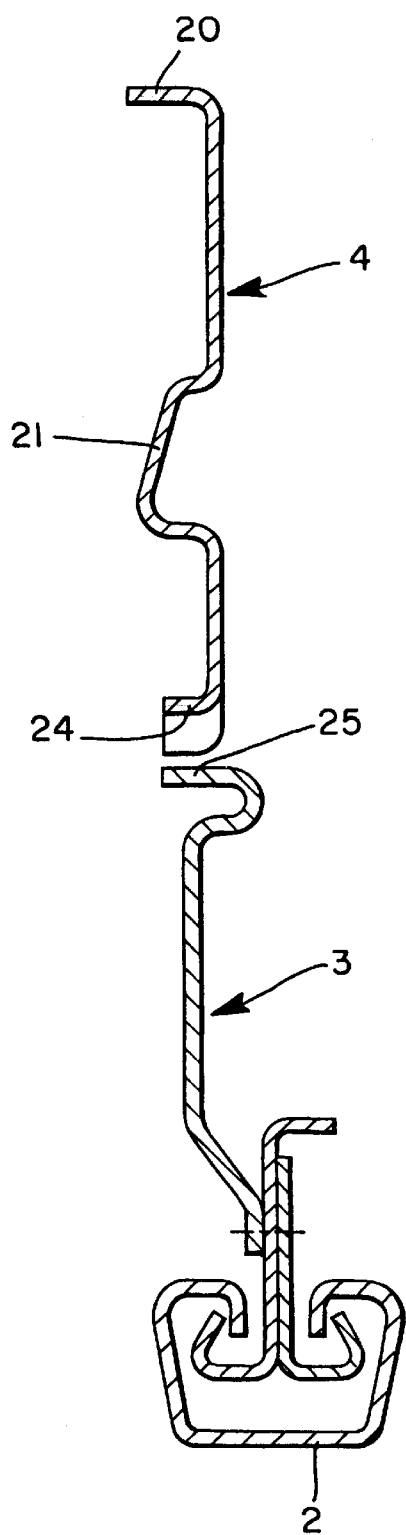
FIG. 3 is a sectional view showing a relationship between an upper rail and a lower arm.
Figure 4:
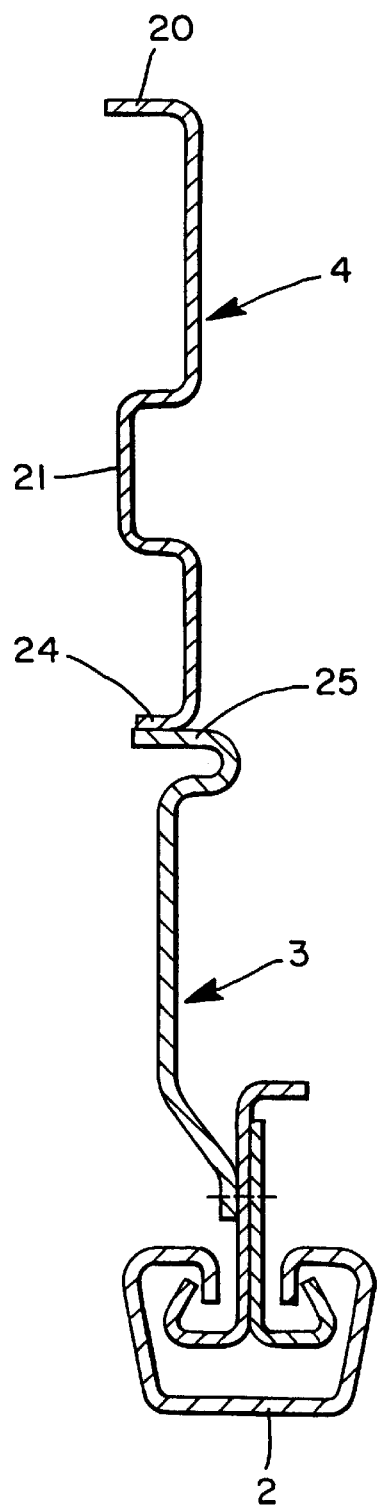
FIG. 4 is a sectional view showing a state in which a recess portion of the lower arms is brought into contact with the upper rail.

According to the example shown in FIG. 1 through FIG. 3, when the vehicle is subjected to a rear collision, the lower arm 4 is going to move in the rear direction by receiving an inertia force directed rearwardly, however, the first recess portion 24 is brought into contact with a projected portion 25 of the upper rail 3 opposed to the first recess portion 24 and movement of the lower arm 4 is hampered. In addition thereto, the external force for deforming the lower arm 4 is resisted by the bead portion 21 and is elastically absorbed by the flat face portion 23 (refer to FIG. 4). In this way, there is no deformation of the lower arm 4 and no destruction of the links 5 and 6 in the case of a collision. Further, when a high load by rear collision of the vehicle is very large, the lower arm 4 is deformed along the boundary between the bead portion 21 and the flat portion 23 with the second recess portion 26 as a reference whereby the energy is absorbed.

Figure 5:
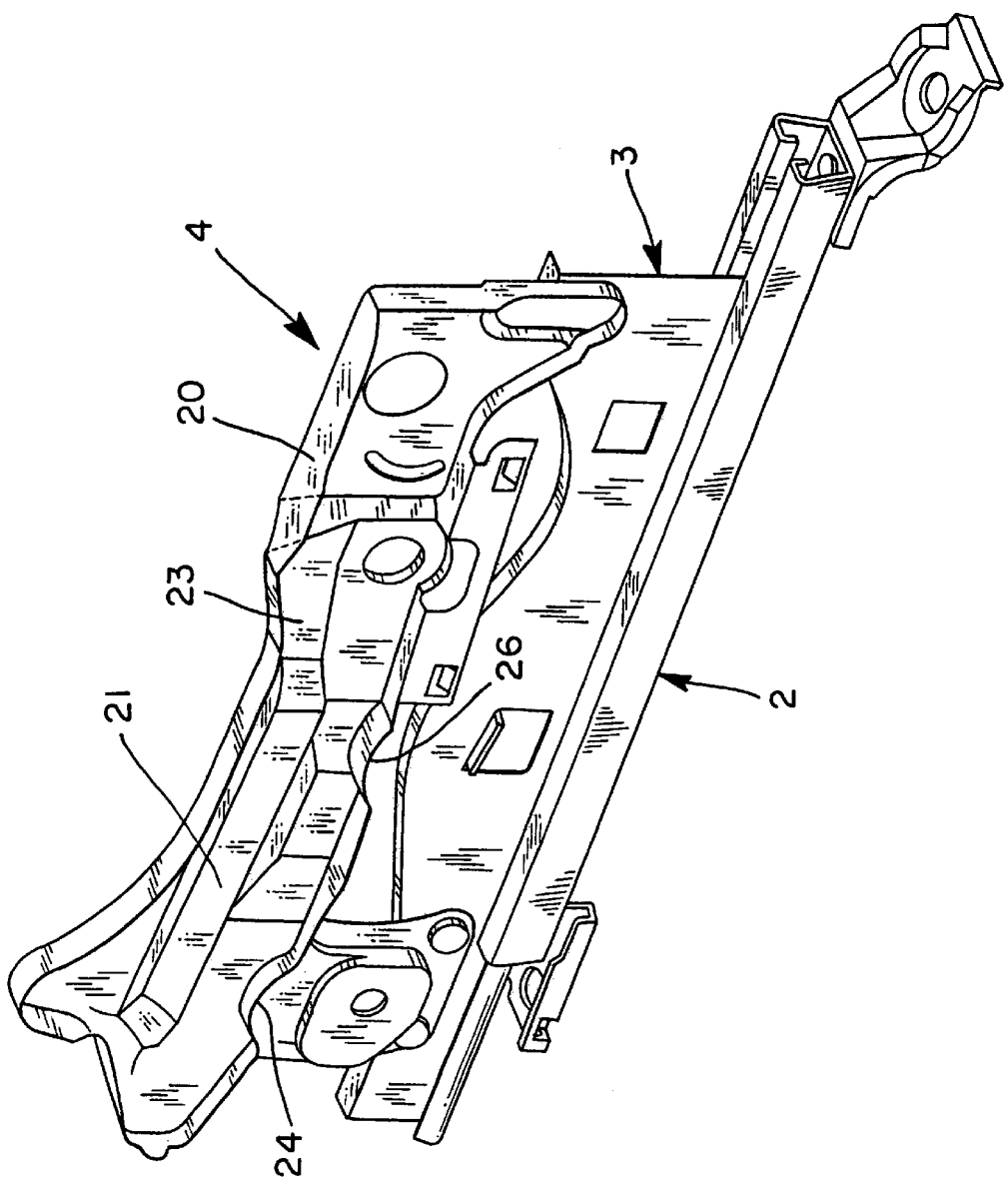
FIG. 5 is a perspective view of another example according to the invention.

FIG. 5 shows an example in which the lower arm 4 is directly fastened to the upper rail 3 by bolts and relative movement between the upper rail 3 and the lower arm 4 is impossible, that is, the links are not used. According to this example, in the case of rear collision, the first recess portion 24 is not brought into contact with the upper rail 3, however, the inertia force in collision is resisted by the bead portion 21 and is elastically absorbed by the flat face portion 23. Further, when a high load by rear collision of the vehicle is very large, the lower arm 4 is deformed along the boundary between the bead portion 21 and the flat portion 23 with the second recess portion 26 as a reference whereby the energy is absorbed.

As many apparently widely different embodiments of the present invention can be made without departing from the spirit and scope thereof, it is to be understood that the invention is not limited to the specific embodiments thereof except as defined in the appended claims.

What is claimed is:

1. A seat structure of a vehicle comprising:

floor side members slidable relative to lower rails adapted to be fixed to a floor of the vehicle; and lower arms each held by a respective one of the floor side members and adapted to support a seat, wherein each of the lower arms comprises a plate lying in a plane, said plate having a flange produced by extending a side edge of the plate in a side direction so that the flange extends out of the plane of the plate, a lower side of the flange of the plate being provided with a contact portion which is brought into contact with a portion of the respective floor side member when a load is applied to the seat upon collision of the vehicle causing the lower arm to move in a rear direction by a rearwardly directed inertia force resulting from the load.

2. The seat structure according to claim 1, wherein each of the floor side members and each of the lower arms are coupled via links, respectively.

3. The seat structure according to claim 1, wherein the contact portion of the lower arm is found on the rear side thereof and has a semi-circular shape.

4. A seat structure of a vehicle comprising:

floor side members slidable relative to lower rails adapted to be fixed to a floor of the vehicle; and lower arms each held by a respective one of the floor side members and adapted to support a seat, wherein each of the lower arms comprises a plate having a flange produced by extending a side edge thereof in a side direction and a lower side of the flange of the plate is provided with a contact portion which is brought into contact with a portion of the respective floor side member when a load is applied to the seat upon collision of the vehicle causing the lower arm to move by an inertia force resulting from the load, wherein a bead portion extended in a longitudinal direction is formed on a vertical wall portion of the lower arms, a flat face is formed on a front side of the vertical wall portion and a deformation base portion disposed at a boundary between the bead portion and the flat face is formed at the lower side of the flange of the lower arms.

5. A seat structure of a vehicle comprising:

floor side members slidable relative to lower rails adapted to be fixed to a floor of the vehicle; and lower arms each held by a respective one of the floor side members and adapted to support a seat, wherein each of the lower arms comprises a plate having a flange produced by extending a side edge thereof in a side direction, a lower side of the flange of the plate is provided with a semi-circular portion, a bead portion extended in a longitudinal direction is formed on a vertical wall portion of the lower arms, a flat face is formed on a front side of the vertical wall, and a deformation base portion disposed at a boundary between the bead portion and flat face is formed at the lower side of the flange of the lower arms.

* * * * *